United States Patent
Sridhar et al.

(10) Patent No.: US 7,657,683 B2
(45) Date of Patent: Feb. 2, 2010

(54) CROSS-THREAD INTERRUPT CONTROLLER FOR A MULTI-THREAD PROCESSOR

(75) Inventors: Kovuri Sridhar, Secundrabad (IN); Narasimhan Venkatesh, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 92 days.

(21) Appl. No.: 12/024,804

(22) Filed: Feb. 1, 2008

(65) Prior Publication Data
US 2009/0198961 A1 Aug. 6, 2009

(51) Int. Cl.
G06F 9/46 (2006.01)
(52) U.S. Cl. ...................... 710/260; 718/100
(58) Field of Classification Search .......... 710/260, 710/262, 268, 269; 718/100, 106–108
See application file for complete search history.

(56) References Cited

U.S. PATENT DOCUMENTS

| | | | |
|---|---|---|---|
| 6,061,710 A | 5/2000 | Eickemeyer et al. | |
| 6,275,749 B1 | 8/2001 | Saville et al. | |
| 6,971,103 B2 | 11/2005 | Hokenek et al. | |
| 7,062,766 B2 * | 6/2006 | Ronkka et al. | 718/100 |
| 7,082,486 B2 * | 7/2006 | DeWitt et al. | 710/260 |
| 2005/0102458 A1 | 5/2005 | Ober et al. | |
| 2007/0130569 A1 | 6/2007 | Heffley et al. | |

* cited by examiner

Primary Examiner—Glenn A Auve
(74) Attorney, Agent, or Firm—File-EE-Patents.com; Jay A. Chesavage

(57) ABSTRACT

An interrupt controller for a dual thread processor has for a first thread, an interrupt request register accessible to the second thread, an interrupt count accessible to the second thread, and an interrupt acknowledge accessible to the first thread. Additionally, the interrupt controller has, for a second thread, an interrupt request register accessible to the first thread, an interrupt count accessible to the first thread, and an interrupt acknowledge accessible to the second thread. Each interrupt controller separately has a counter for each request which increments upon assertion of a request and decrements upon assertion of an acknowledgement.

18 Claims, 6 Drawing Sheets

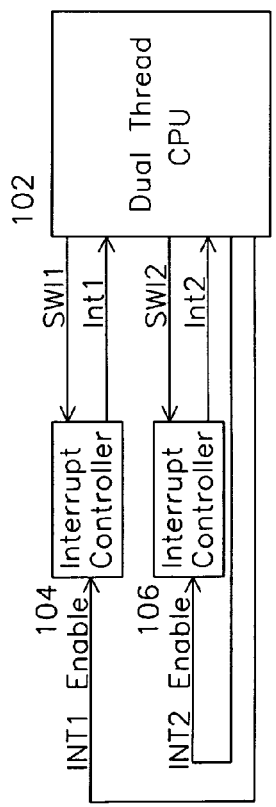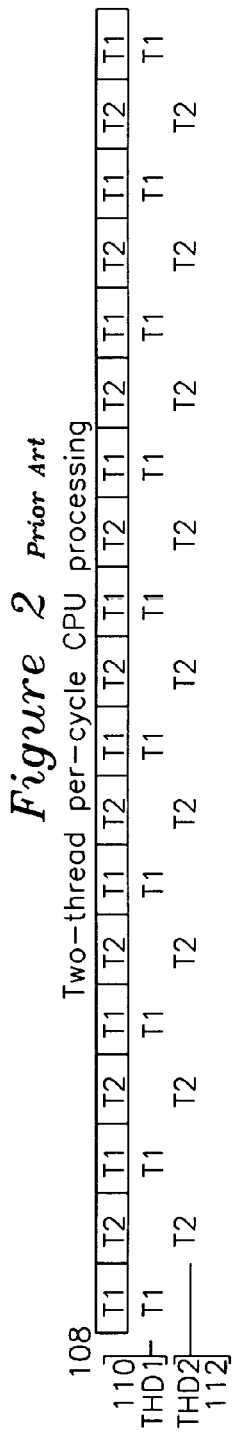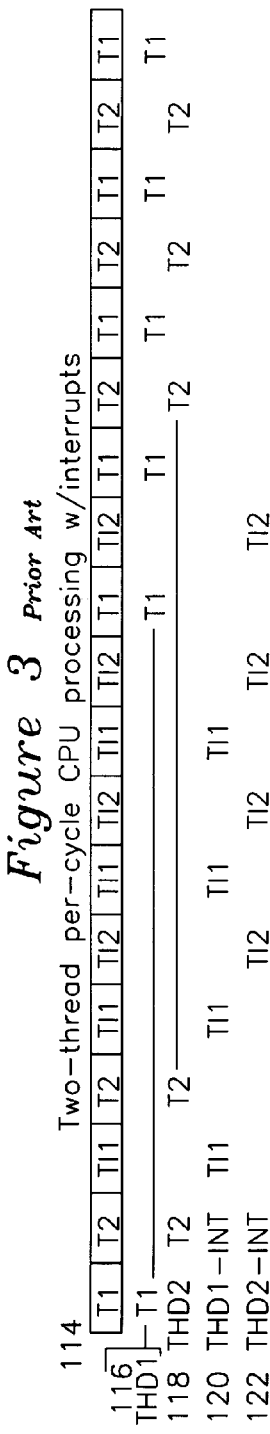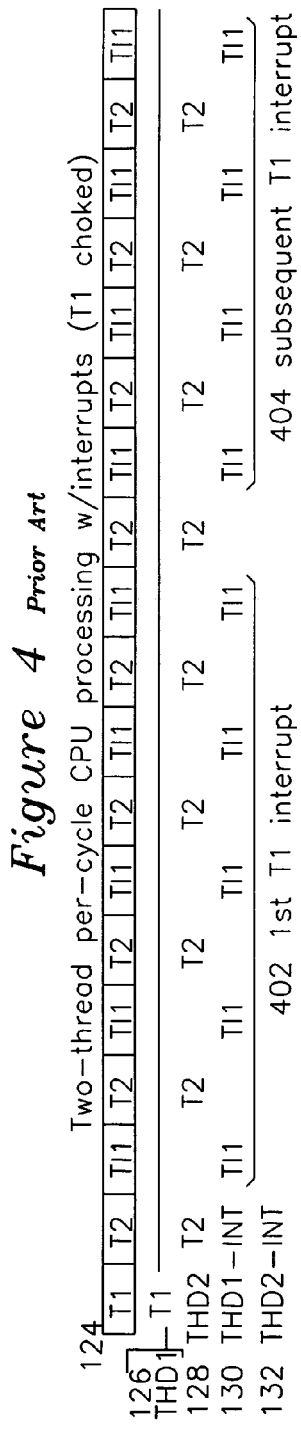

Figure 7A
Interrupt Handlers

| Thread 1 | Thread 2 |
|---|---|
| IRQ1: Event 1 (E1) | IRQ1: Event 8 (E8) |
| Put pkt in buff 1 | Put pkt in buff 3 |
| | |
| IRQ2: Event 2 (E2) | IRQ2: Event 9 (E9) |
| Put pkt in buff 2 | Put pkt in buff 4 |

CROSS-THREAD INTERRUPT CONTROLLER FOR A MULTI-THREAD PROCESSOR

FIELD OF THE INVENTION

The present invention relates an interrupt controller for a multi-thread processor. In particular, the present invention provides for a first thread to request an interrupt for handling by a different thread, and includes a counter for tracking the number of requests and number of events serviced.

BACKGROUND OF THE INVENTION

FIG. 1 shows a prior art dual thread CPU 102 coupled to a first thread interrupt controller 104 and a second thread interrupt controller 106. FIG. 2 shows the execution of threads where CPU 102 has alternating cycles devoted to each thread as shown in 108. As can be seen in FIG. 2, each subsequent cycle is directed to an alternate thread, such that both threads THD1 110 and THD2 112 receive equal processing time. FIG. 3 shows the execution of a first thread THD1 116 as well as an interrupt THD1-INT 120, along with second thread THD2 118 and second thread interrupt THD2-INT 122. The time diagram 114 shows the roughly equal time devoted to processing the thread programs THD1 116 and THD2 118, as well as the thread interrupts THD1-INT 120 and THD2-INT 122.

FIG. 4 shows the effect of a disproportionate number of interrupts on a first thread T1 126 with the interrupts, noted as THD1-INT 130. The processing diagram 124 of FIG. 4 shows one cycle of first thread program THD1 126, and a first and second THD1-INT 402 and 404, while bandwidth is available in THD2 128.

U.S. Pat. No. 6,971,103 shows an inter-thread interrupt processor where one thread can assert an interrupt to a different thread using a thread identifier. Provision is made for only a single interrupt, which is cleared upon service.

U.S. Pat. No. 6,275,749 shows a memory system for use in context switching when servicing interrupts for a multi-thread processor.

U.S. Patent Application 2005/0102458 describes a priority encoder for use in a multi-thread processor which prevents the inversion of priority caused by interrupts of different priorities which arrive on one thread while another thread is executing.

U.S. Pat. No. 6,061,710 describes an interrupt handling system which initiates a new thread to handle new interrupt requests.

OBJECTS OF THE INVENTION

A first object of this invention is an inter-thread controller for a first thread and a second thread, whereby a first thread may request an interrupt to the second thread, which first thread request increments an associated interrupt count which can be read by the first thread, where an interrupt count greater than zero results in assertion of an interrupt to the second thread.

A second object of the invention is for a second thread, in response to an asserted interrupt, to handle an interrupt and acknowledge the interrupt to an interrupt controller, which responds by decrementing an interrupt count associated with this interrupt.

A third object of the invention is an inter-thread controller for a first thread and a second thread, whereby a second thread may request an interrupt to the first thread, thereby incrementing an associated interrupt count with the option to read the interrupt count, where an interrupt count greater than zero results in assertion of an interrupt to the first thread.

A fourth object of the invention is for a first thread, in response to an asserted interrupt, to handle the interrupt and acknowledge the interrupt to an interrupt controller, which responds by decrementing an interrupt count associated with the first thread interrupt.

SUMMARY OF THE INVENTION

A cross-thread interrupt processor for a multi-thread processor has a first interrupt controller which has a request register and an interrupt count register, both of which are available only to a second thread, and which request register controls the assertion of an interrupt to the first thread, and the first interrupt controller also has an interrupt acknowledge register and an interrupt mask register which is only available to the first thread. A second interrupt controller has a request register and an interrupt count register, both of which are available only to a first thread, and which request register controls the assertion of an interrupt to the second thread, where the second interrupt controller also has an interrupt acknowledge register and an interrupt mask register which is only available to the second thread.

An independent first and second thread process are executing, and a first handler responsive to a first event is located in the instructions for the first thread, and a second handler responsive to a second event is located in the instructions for the second thread. When a first thread first event is detected, the first thread handles it directly. When a first thread second event occurs, the first thread reads the second thread interrupt count register of the second interrupt controller, and if it is greater than a threshold value, the assertion of an interrupt to the second thread is deferred, otherwise an interrupt is asserted to the second thread by asserting an interrupt request to the second thread. Similarly, when a second thread second event occurs, the second thread handles it directly. When a second thread first event occurs, the second thread reads the first thread interrupt count from the first thread interrupt controller, and if the first thread interrupt count is not greater than a threshold value, an interrupt is asserted to the first thread. The interrupt handler for the first thread responds to an interrupt by determining which interrupt for the thread was asserted, handling each particular interrupt, and issuing an interrupt acknowledgement to the first thread interrupt controller, thereby decrementing the interrupt count by one. If the handler disposes of multiple requests, the number of events disposed are separately acknowledged. Similarly, the interrupt handler for the second thread responds to an interrupt by determining which interrupt for the thread was asserted, handling each particular interrupt, and issuing an interrupt acknowledgement to the second thread interrupt controller, thereby decrementing the interrupt count by one. If the handler responds to multiple events, the number of events handled are acknowledged. In this manner, a particular thread is able to send interrupt events to a different thread, and a plurality of interrupt requests and acknowledgements is handled by the interrupt controller using a counter which increments or decrements for each interrupt thread.

BRIEF DESCRIPTION OF THE DRAWINGS

FIG. 1 shows the block diagram for a dual thread CPU coupled to interrupt controllers.

FIG. 2 shows a timing diagram for the CPU of FIG. 1 executing two threads.

FIG. 3 shows a timing diagram for the CPU of FIG. 1 executing two threads and interrupts.

FIG. 4 shows a timing diagram for the CPU of FIG. 1 executing a program thread and stalling on an interrupt thread.

FIG. 7A shows the assignment of events and interrupts for the first and second thread of FIG. 7B.

DETAILED DESCRIPTION OF THE INVENTION

Figure 5:
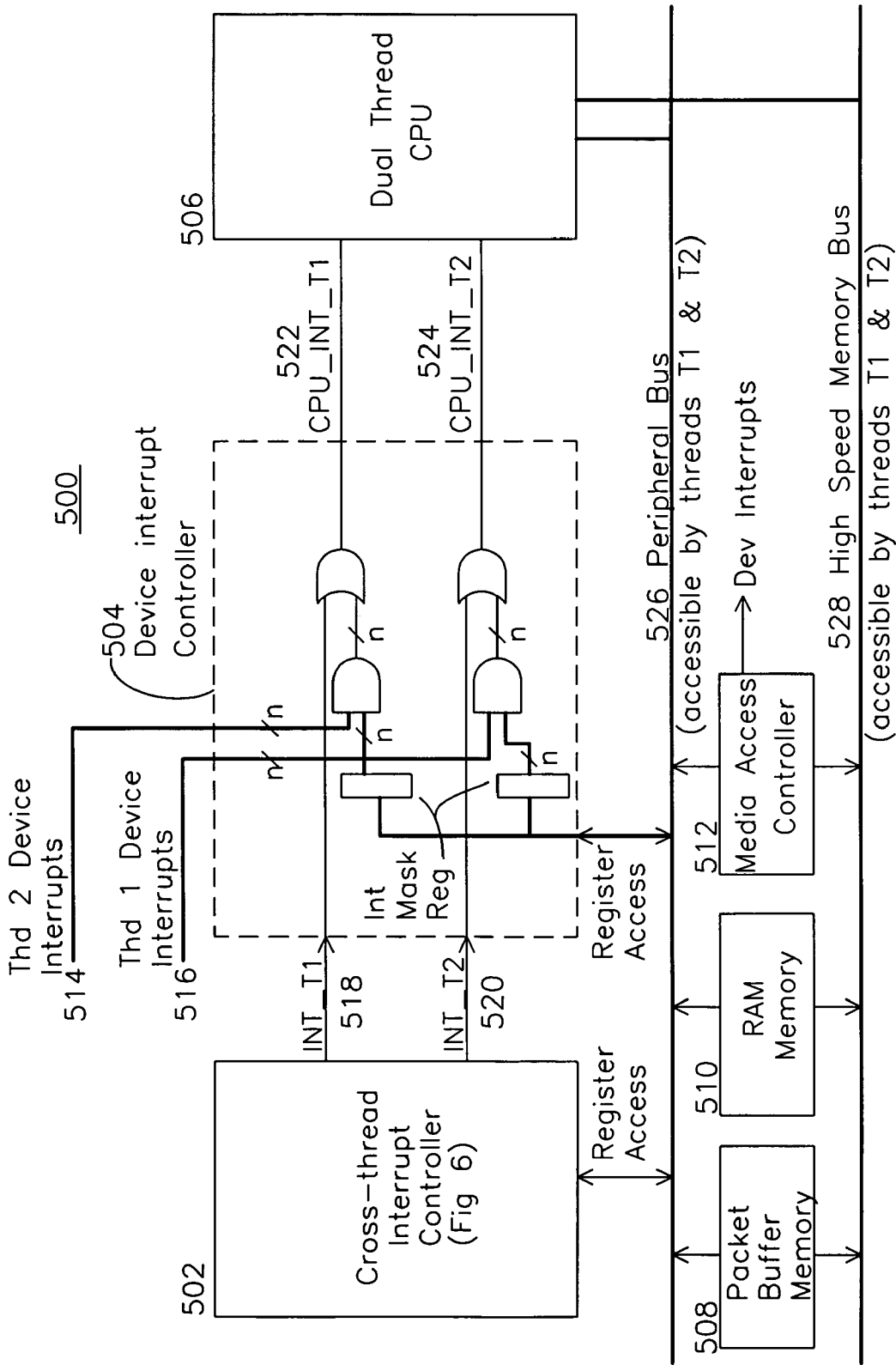
FIG. 5 shows an overall block diagram for a dual thread CPU which includes a cross thread interrupt controller.

FIG. 5 shows a block diagram 500 of a processor with cross thread processing. A dual thread CPU 506 comprises a dual thread processor such as the interleaved processor described in assignee's patent application Ser. No. 11/899,557, wherein each thread is handled on a successive CPU cycle, as shown in FIG. 2. There are many advantages of separating processes into individual threads, among them the ability for one thread to continue processing when the other thread is waiting for completion of an event, such as during an interrupt or waiting for a slow peripheral device on a bus, known as a "thread stall". The dual thread CPU 506 may include a first interrupt input 522 which may be a plurality of individual interrupts requesting attention from the first thread, such that a particular event handler, or interrupt service routine, may be associated with a particular interrupt, or event. The second thread similarly has its own interrupt inputs 524. The CPU 506 also is coupled through a peripheral bus 526 accessible by a first and second thread to a plurality of peripherals such as a media access controller 512, high speed RAM or RAM controller 510, and packet buffer memory or packet buffer memory controller 508. Typically, the peripheral bus 526 has relatively slow response times, and is used to handle "out of band" transactions that tend to be slow, such as accessing device registers and slow peripherals. A high speed memory bus 528 is used for high speed transactions, and typically includes bursting and other features suitable for moving data from temporary storage in RAM 510 to a packet buffer memory 508 suitable for access by MAC 512, which may also have its own bursting and block transfer modes for moving data in and out of a wireless channel associated with the MAC 512. A device interrupt controller 504 is responsible for aggregating hardware interrupts originating from various subsystems such as the MAC 512 and other devices which detect a particular condition and may issue an interrupt request. The device interrupt controller 504 of FIG. 5 accepts interrupts for particular handlers that reside on particular threads. For example, if the MAC 512 issues an interrupt to signify a new packet has arrived, and a handler which is available only on a first thread is to read the packet header to determine which priority queue the packet should be directed and setting pointers in the MAC 512 to perform a block transfer of the packet to a particular packet memory location 508, then this particular MAC interrupt is directed to the thread 1 interrupt inputs 516. In general, event handlers for FIG. 5 are associated with a particular thread, such that the executable program which handles a particular event resides on a particular thread. For hardware events, the implication is only that the interrupt request line associated with that event must be directed to the appropriate thread interrupt, such as 514 or 516. For software interrupts, a cross-thread interrupt controller 502 provides this cross thread interrupt capability.

Figure 6:
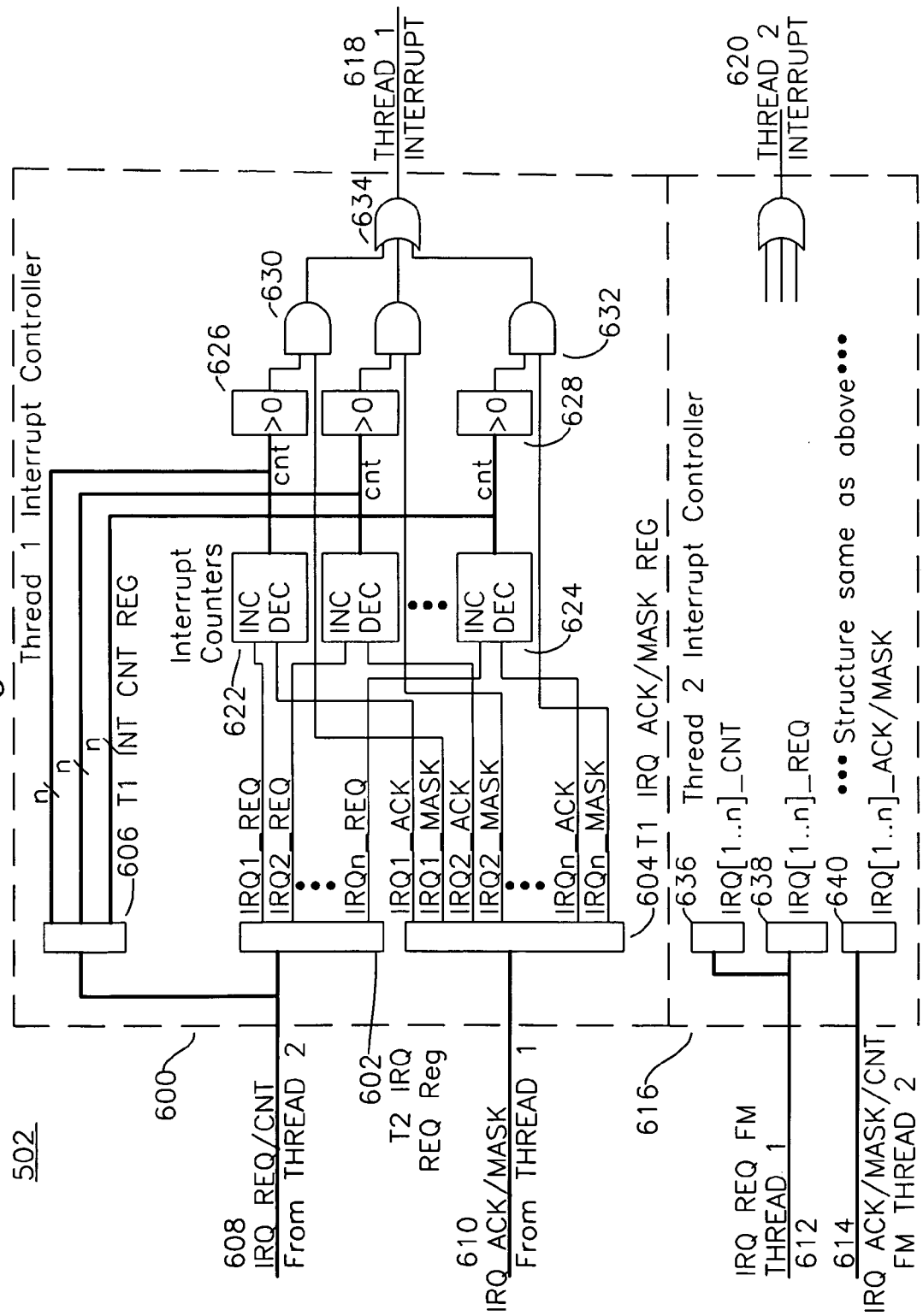
FIG. 6 shows cross-thread interrupt controllers of FIG. 5 for a first and second thread.

FIG. 6 shows a cross-thread interrupt controller 502 which has a first thread interrupt controller 600 and a second thread interrupt controller 616, which has similar internal processing as shown for first thread controller 600. Interrupt requests 608 from a second thread such as arriving from the peripheral bus 522 of FIG. 5 are coupled to interrupt request register 602 and cause an associated interrupt counter 622 to increment. The value of each interrupt count register 622 is available to the requesting first thread through count register 606, and each interrupt request 1 through n has an associated counter 622 through 624 which can be read by the second thread via count register 606. When an interrupt count is greater than 0 for a particular interrupt, the associated comparator 626 through 628 asserts an output, which is ANDed 630 through 632 with a mask bit from an interrupt mask register 604 accessible to the first thread, such that the first thread responding to the interrupt can mask or acknowledge the interrupt. The outputs of each of the mask AND gates 630 through 632 are ORed together 634 to generate a first thread interrupt 618. In this manner, a first thread interrupt 618 may be generated by an event causing a request 608 from a second thread, and masked or acknowledged 610 by the process of the first thread, typically as part of the interrupt service routing handling it.

The second thread interrupt controller 616 of FIG. 6 operates in an analogous manner as controller 600, where a set of interrupt request registers 638 is available to a first thread requester 612, and the first thread requester 612 can also read the interrupt count registers 636, and the interrupt is acknowledged or masked 640 via second thread read operation 614 such as through a peripheral bus. The interrupt counters of second thread interrupt controller 616 are compared with 0 and ANDed with a mask register value, ORed together to produce second thread interrupt 620.

FIG. 7A shows an example allocation of interrupt handlers to threads. Thread 1 may have a handler associated with event 1 (E1), which is requested by asserting IRQ1 of thread 1, which causes a packet to be removed from a MAC and placed in buffer 1. Thread 1 may also have handler associated with event 2 (E2), which is requested by asserting IRQ2 of thread 1, and results in a packet to be removed from a MAC and placed in buffer 2. The unrelated process of thread 2 may have a handler associated with an event 8 (E8), which results in a packet moved from a MAC into buffer 3 upon assertion of IRQ1 for thread 2, and thread 2 may also have a handler associated with an event 9 (E9), which results in a packet moved from a MAC into buffer 4 in response to the assertion of IRQ2 for thread 2.

Figure 7B:
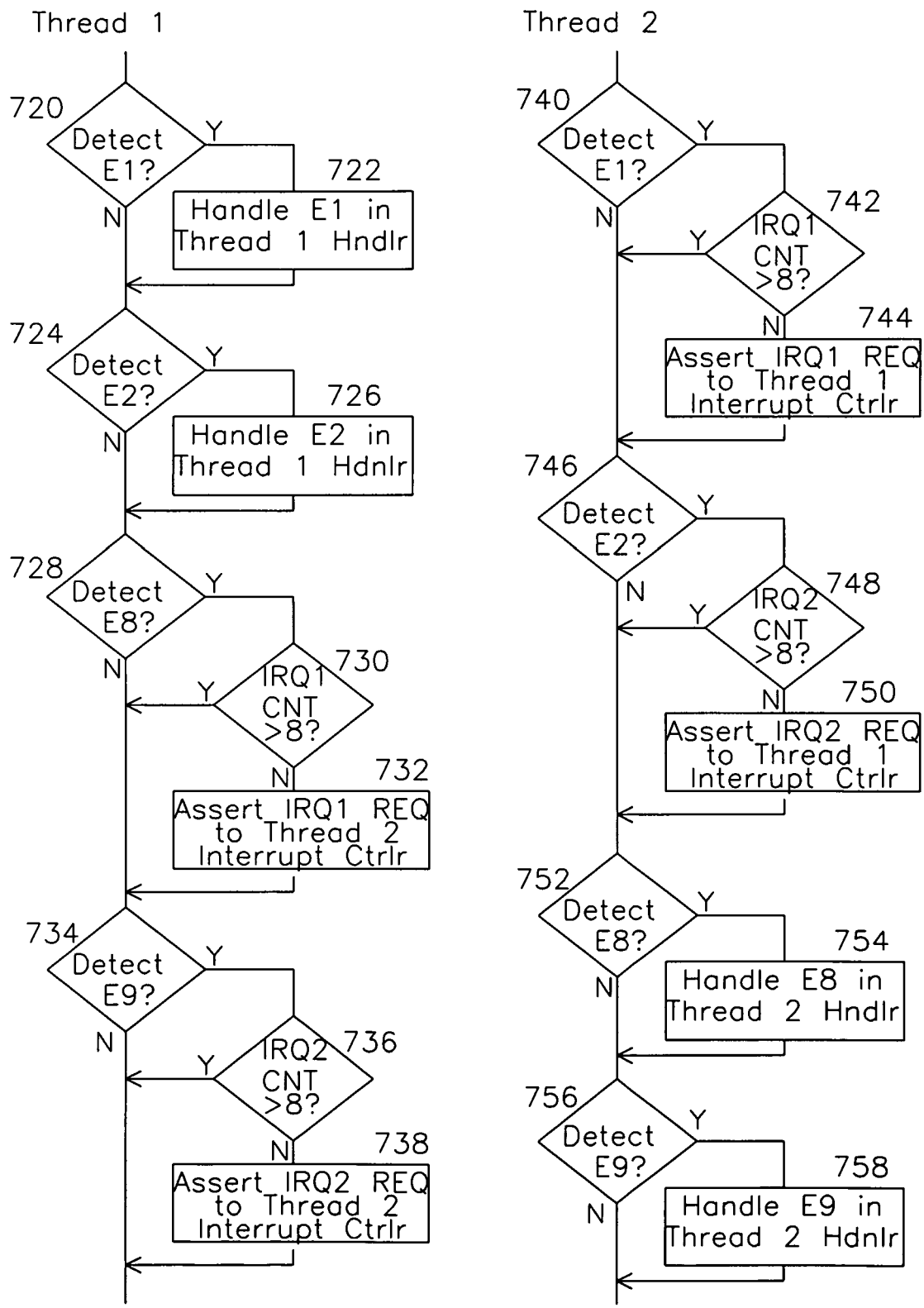
FIG. 7B shows a flowchart for each thread of a program handling in-thread and cross-thread events.

FIG. 7B shows a fragment of a thread 1 process and a thread 2 process, typically associated with non-interrupt processing such as a software task, where various events are detected and related activities performed, as was described for FIG. 7A. Thread 1 may detect event 1 (E1) at 720, and since E1 is handled by this same thread, the processing is completed by thread 1 handler 722. If E2, another handler in the same thread space, is detected 724, the handler is invoked 726. If E8 is detected 728, the event must be handled by E8 handler on thread 2. A check of the IRQ1 count is made 730 by reading the interrupt count register 636 of FIG. 6 to determine that the number of unserviced interrupts is not above a certain threshold, and if not, a request is made via register 638 of FIG. 6 to assert IRQ1 in step 732. Similarly, if E9 is detected 734, and the interrupt count read from register 636 for associated IRQ2 736 is below a threshold, the interrupt service routine on thread 2 is invoked 738 by requesting IRQ2 via an interrupt register 638.

The handling of the same events E1, E2, E8, and E9 is performed for thread 2 by locally processing E8 and E9, as those routines are located on thread 2, and asserting interrupts to handle E1 and E2, thereby transferring them to thread 1. If E1 is detected 740, and the interrupt count read 606 by the second thread is below a threshold 742, IRQ1 is asserted in step 744 by a request to register 602. If E2 is detected 746 and the interrupt count read 606 by the second thread is below a threshold 748, IRQ2 is asserted by a request to register 602 in step 750. Events E8 and E9 relate to a local handler, so detection of E8 752 or E9 756 simply invoke the related handlers 754 and 758, respectively.

Figure 8:
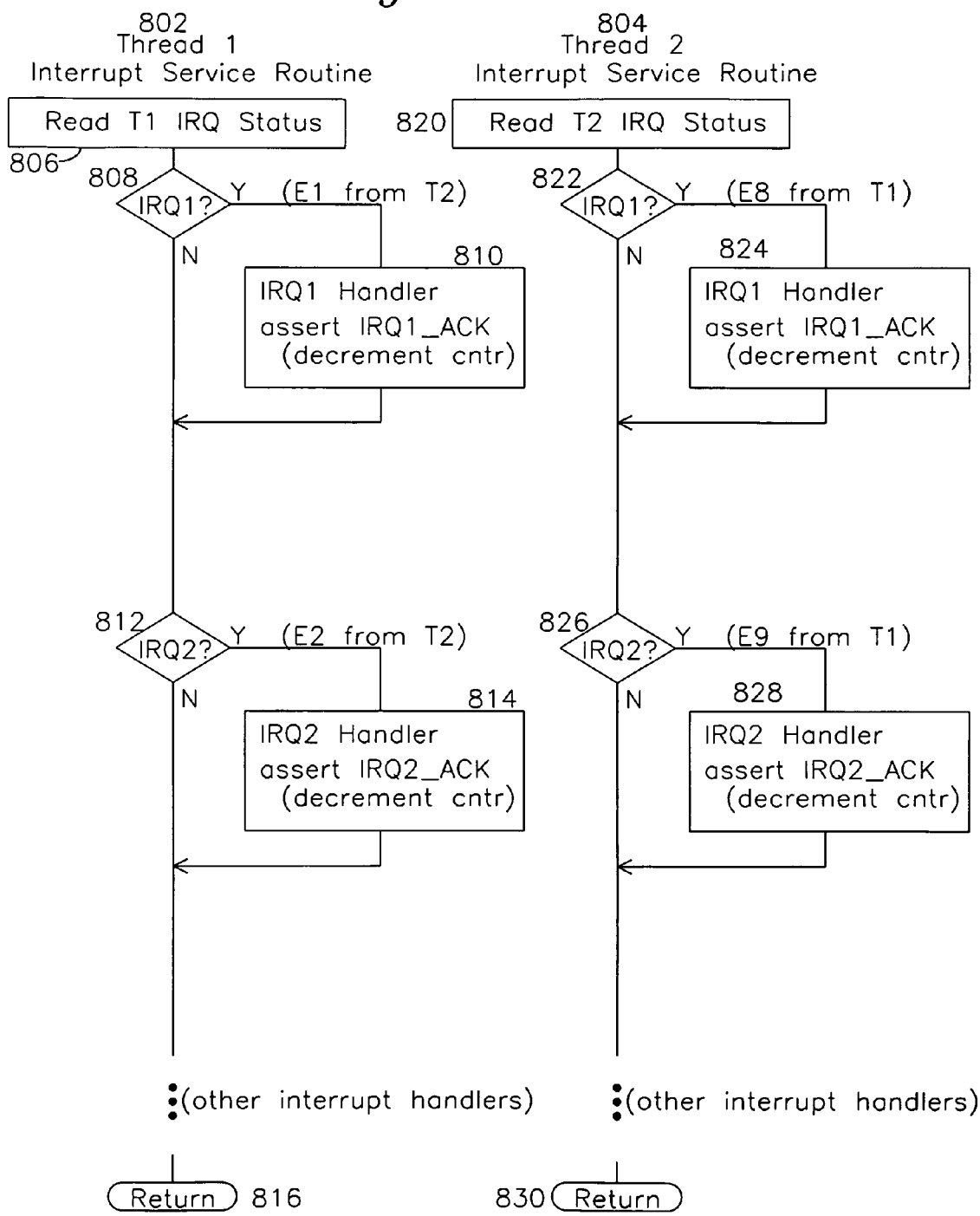
FIG. 8 shows the interrupt service routines for a first and second thread.

FIG. 8 shows an interrupt service routine for a first thread and a second thread. As was described earlier, E1 and E2 are handlers accessible only to the first thread, and E8 and E9 are handlers accessible only to the second thread. The first thread interrupt routine is entered 802 and the interrupt controller status for the various interrupts IRQ1 through IRQn for the first thread is read to determine which interrupts are present in step 806. If IRQ1 is asserted 808, the IRQ1 handler 810 is executed, after which the IRQ1_ACK is asserted, which results in decrementing the interrupt count via register 604. If IRQ2 is asserted 812, the associated IRQ2 handler 814 is run, after which the IRQ2_ACK is asserted via register 604. After any other handlers, the interrupt service routine returns 816. The second thread 804 similarly processes interrupts by reading the thread 2 interrupt status register in step 820, after which each interrupt bit is tested. If IRQ1 is present 822, the IRQ1 handler is executed, after which the IRQ1_ACK bit is asserted to register 640, which decrements the interrupt count for this particular interrupt. If IRQ2 is present 826, the IRQ2 handler 828 is executed, after which IRQ2_ACK is asserted via register 640, which results in decrementing the associated interrupt counter. After any other processing occurs, the interrupt service routine exits in step 830.

We claim:

1. A cross-thread interrupt processor for a dual thread CPU having a first thread process and a second thread process, the interrupt processor having:
   a first interrupt controller (IC1) operative to receive interrupt requests from said second thread process and generate IC1 interrupts coupled to said first thread process and also to provide IC1 interrupt counts to said second thread process, said first interrupt controller also operative to receive interrupt acknowledgements from said first thread process;
   a second interrupt controller (IC2) operative to receive interrupt requests from said first thread process and generate IC2 interrupts coupled to said second thread and also to provide IC2 interrupt counts to said first thread process, said second interrupt controller also operative to receive interrupt acknowledgements from said second thread process;
   where said first interrupt controller interrupt request from said second thread process causes an associated IC2 interrupt count to increment, and said first interrupt controller acknowledgement from said first thread causes said IC1 interrupt count to decrement, said IC1 interrupt count asserting said IC1 interrupt coupled to said first thread process said IC1 interrupt if said IC1 interrupt count is greater than 0;
   where said second interrupt controller interrupt request from said first thread process causes an associated IC2 interrupt count to increment, and said second interrupt controller acknowledgement from said second thread causes said IC2 interrupt count to decrement, said IC2 interrupt count asserting said IC2 interrupt coupled to said second thread process interrupt if said IC2 interrupt count is greater than 0.

2. The interrupt processor of claim 1 where said first interrupt controller includes a mask register for disabling interrupts, said mask register accessible by said first thread process.

3. The interrupt processor of claim 1 where said second interrupt controller includes a mask register for disabling interrupts, said mask register accessible by said second thread process.

4. The interrupt processor of claim 1 where said first or second interrupt controller interrupt request is associated with a particular one of said interrupt counts.

5. The interrupt processor of claim 1 where:
   a first interrupt handler has executable instructions for use with a first event accessible only to said first thread process;
   a second interrupt handler has executable instructions for use with a second event accessible only to said second thread process;
   said first thread process asserts said interrupt request to said second interrupt controller upon detection of said second event.

6. The interrupt processor of claim 5 where said second thread process asserts said interrupt request to said first interrupt controller upon detection of said first event.

7. The interrupt processor of claim 5 where said IC1 interrupts are logically ORed with a plurality of external interrupts, each said external interrupt having an external interrupt input and an optional interrupt mask.

8. The interrupt processor of claim 5 where said IC2 interrupts are logically ORed with a plurality of external interrupts, each said external interrupt having an external interrupt input and an optional interrupt mask.

9. The interrupt processor of claim 1 where said first thread process and said second thread process are alternating processing cycles of a single processor.

10. A process for requesting and acknowledging events for a first and second thread, said first thread having primary handlers and said second thread having secondary handlers:
   where first thread detects an event associated with said primary handler, said first thread thereafter executing instructions of said primary handler, and where said first thread detects an event associated with said secondary handler, said first thread thereafter reading an associated second thread interrupt count, and if said second thread interrupt count is below a threshold, asserting a second thread interrupt request causing said second thread interrupt count to increment, said second thread interrupt count greater than zero resulting in the assertion of a second thread interrupt;
   where said second thread detects an event associated with said secondary handler, said second thread thereafter executing instructions of said secondary handler, and where said second thread detects an event associated with said primary handler, said second thread thereafter reading an associated first thread interrupt count, and if said first thread interrupt count is below a threshold, asserting a first thread interrupt request causing said first thread interrupt count to increment, said first thread interrupt count greater than zero resulting in the assertion of a first thread interrupt;
   where upon assertion of a first thread interrupt, said first thread handler instructions execute, and thereafter said first thread asserts an interrupt acknowledge resulting in the decrementing of said first thread interrupt count;

and where upon assertion of a second thread interrupt, said second thread handler instructions execute, and thereafter said second thread asserts an interrupt acknowledge resulting in the decrementing of said second thread interrupt count.

11. The process of claim 10 where said first thread interrupt count includes a mask register for disabling said first thread interrupt, said mask register accessible by said first thread.

12. The process of claim 10 where said second thread interrupt count includes a mask register for disabling said second thread interrupt, said mask register accessible by said second thread.

13. The process of claim 10 where said primary handler contains executable instructions responsive to at least a first interrupt request and said secondary handler contains executable instructions responsive to at least a second interrupt request.

14. The process of claim 10 where:

said primary handler has executable instructions for use with a first event and is accessible only to said first thread;

said secondary handler has executable instructions for use with a second event and is accessible only to said second thread;

said first thread asserts said first thread interrupt request to said second interrupt count upon detection of said second event.

15. The process of claim 14 where said second thread asserts said second thread interrupt request to said first interrupt count upon detection of said first event.

16. The process of claim 14 where said primary handler also includes executable instructions for external events associated with at least on external interrupt request, and said external interrupt request is logically ORed with said first thread interrupt.

17. The process of claim 14 where said secondary handler also includes executable instructions for external events associated with at least one external interrupt request, and said external interrupt request is logically ORed with said second thread interrupt.

18. The process of claim 10 where said first thread and said second thread are alternating processing cycles of a single processor.

* * * * *